United States Patent [19]

Heidborn

[11] 4,219,427

[45] Aug. 26, 1980

[54] CONICALLY SHAPED METAL SCREEN BODIES AND METHOD FOR MANUFACTURING SUCH BODIES

[75] Inventor: Ernst Heidborn, Brunswick, Fed. Rep. of Germany

[73] Assignee: Balco Filtertechnik GmbH, Brunswick, Fed. Rep. of Germany

[21] Appl. No.: 24,319

[22] Filed: Mar. 27, 1979

[30] Foreign Application Priority Data

Apr. 3, 1978 [DE] Fed. Rep. of Germany ....... 2814359
Apr. 3, 1978 [DE] Fed. Rep. of Germany ... 7809821[U]

[51] Int. Cl.$^2$ .................. B01D 25/04; B01D 33/02
[52] U.S. Cl. ............................ 210/497 R; 220/400; 220/470; 220/DIG. 22
[58] Field of Search ............ 210/78, 369, 360 R, 210/360 A, 380 R, 380 H, 483, 497 R; 55/498, 500, 521; 220/400, 470, 62, 73, 74, 83, DIG. 22

[56] References Cited

U.S. PATENT DOCUMENTS 3,980,563  9/1976  Greutert et al. ................. 210/380 R

*Primary Examiner*—Frank Sever
*Attorney, Agent, or Firm*—W. G. Fasse; D. F. Gould

[57] ABSTRACT

A conically shaped metal screen body, especially for household juice centrifugals, is made of a plain circular-sector screen foil member which is first produced. The sector member is then brought into the three-dimensional closed conical shape by forming a longitudinal seam along the radial edges. The upper end of the closed conical shape is then provided with a fitting flange for bracing and for deflecting the juice. The lower end is also provided with a fitting flange for connecting the screen body to the driving shaft and/or for securing a rasping or grating disk. The upper and lower fitting flanges of the screen body are made by non-cutting shaping from corresponding rim allowances at both radial ends of the screen foil member. Thus, the finished screen body is a single piece, integral structure.

10 Claims, 12 Drawing Figures

CONICALLY SHAPED METAL SCREEN BODIES AND METHOD FOR MANUFACTURING SUCH BODIES

BACKGROUND OF THE INVENTION

The invention relates to a method for manufacturing conically shaped metal screen bodies for centrifugals, especially for household juice centrifugals. The invention also relates to centrifugals made according to the present method.

It is known to equip continuously operating centrifugals with conical metal screen bodies. Screen bodies for industrial centrifugal machines mostly rest on supporting baskets, whereas in household centrifugals the screen body is a load-bearing component in addition to its screen function. Therefore, the strength and inherent stability of the screen bodies in household centrifugals are of particular importance. Screen bodies used in households are subject to uncontrollable and improper handling, and that is why their strength and stability, as well as their resistance to cleaning and scouring agents are essential features to be carefully taken into account in their manufacture. Household centrifugals operate at relatively high speeds. For this reason, a high resistance and sturdiness of the screen body is very important to avoid household accidents.

Screen bodies of the afore-mentioned type are mass produced in rather great numbers. Therefore, manufacturing costs must be kept down in spite of said high demands on usability.

Prior art methods for manufacturing screen bodies for household juice centrifugals are rather complicated and costly and the known screen bodies have a number of serious disadvantages.

Hertofore the screen foils or thin screen metal sheets are made mainly by electroforming also known as galvanoplastic deposition. In order that for said process and the resultant small screen foil thicknesses the necessary mechanical strength and welding stability may be ensured, metal materials of the hard nickel type are commonly used to make the screen.

According to a known manufacturing process, a circular-sector screen foil is made by electroforming. This foil is then formed into the three-dimensional conical shape by welding or soldering the longitudinal edges of the circular-sector screen foil to each other. Separately prefabricated flange-like parts are then welded or soldered to the upper and lower ends. These flange-like parts consist of a material which is very thick compared to the thickness of the screen foil and have a correspondingly high weight. Both soldering and welding heat up the screen foil. Such heating makes the material of the screen brittle to such an extent that many screen bodies break already after a short time of use. This material fatigue is even accelerated by the comparatively high weight of the flange-like part at the upper end of the screen body due to the high speeds, to which the screen body in continuously working household juice centrifugals is subjected. Such high speeds produce correspondingly high mass forces. The slightest non-symmetric mass distribution between the lower flange-like part and the upper flange-like part, which cannot be avoided even by maintaining strict manufacturing tolerances, continuously cause such mass forces. These forces must be transmitted from the upper flange-like body or part to the lower flange-like body through the material of the screen foil, which is comparatively thin, weak and thermally preweakened in addition by the soldering or welding. The well known so-called vibration or flutter ruptures are the result of said known manufacturing process.

In another known process an attempt was made to provide the screen body of conical shape with the flange-like parts by spray attaching same, at least at the upper end. In this way the thermal loading at the upper rim of the screen foil could be prevented, however, said method also did not yield satisfactory results because there is a limit to the strength of sprayable plastic material, whereby the resultant weight of the upper flange-like part became quite high which led to the mentioned unfavorable dynamic loads on the screen foil. Besides, plastics material is not an ideal material for this purpose, because it does not have the necessary surface hardness required to withstand the effects of load components processed in household juice centrifugals, e.g., pits of berries or the like. Therefore, molded plastic parts became quickly dulled and/or show scratches and surface cracks. Plastics material, in addition, is very sensitive to such surface conditions in terms of material strength.

Another known process described in German Patent Publication No. 2,153,901 did not eliminate the weight problem as such, but it did avoid the disadvantageous influences on the strength of the screen body. According to said known process the screen body is composed of three circular-sector screen foils, the edges of which have bent areas serving as anchoring means. By using the anchoring means in appropriate molds, these three screen foil pieces are sprayed with plastic in such a way that a basket-like plastic body is produced which encloses the edges of the screen foil pieces. During this process, plastic ribs are formed along the surface line or generatrix of the screen body. These ribs are attached in an integral manner to the flange-like parts at the upper and lower end of the screen body. This manufacturing process, of course, mechanically relieves the screen foil pieces to a great extent, and the basket-like plastic body is the load bearing element proper. The screen bodies made in this way, however, have a relatively high weight and are afflicted with the disadvantages resulting from the use of plastic materials in this particular environment.

For the sake of completeness, another known process should be mentioned, wherein the three-dimensional conical shape of the screen foil is made by electroforming or deposition. This process has the advantage that the longitudinal seam for producing the three-dimensional conical shape may be avoided. However, substantial problems are encountered when the matrix dies required for electroforming have to be regenerated. Therefore, this known process also does not solve the problem of economically manufacturing screen bodies.

OBJECTS OF THE INVENTION

In view of the above it is the aim of the invention to achieve the following objects singly or in combination:

to avoid the above mentioned disadvantages of known processes, specifically to improve the first mentioned process so that the manufacturing costs may be reduced and so that the screen bodies will have a very low weight and a high mechanical strength and sturdiness;

to construct the screen body proper and its flanges as an integral structure with a single closing seam extending along a generatrix of the conical or frustum screen body;

to minimize the weight of such screen structures without reducing the strength thereof to effectively withstand the loads to which these screens are subject in operation;

to shape relatively brittle, thin screen material without any cutting operation;

to interconnect the edges forming a seam of a centrifugal screen extending along the generatrix thereof without any soldering or welding to avoid thermal stresses in the screen body;

to balance the screen body without the use of thermal or cutting machining steps; and to provide a conical or frustum screen body for centrifugals, especially small household centrifuges which has upper and lower flange members forming an integral part of the screen.

SUMMARY OF THE INVENTION

According to the invention there is provided a method for making centrifugal screen bodies by first making a plane circular-sector screen foil, then making a longitudinal seam to form the plane screen into the three-dimensional conical shape. Thereafter a flange member is provided at the upper end for bracing and for deflecting the juice. A further flange member is formed at the lower end for connecting the screen body to a driving shaft and/or for securing a rasping or grating disk. The upper and lower flanges at the ends of the screen body are formed by a non-cutting shaping of corresponding rim portions of the screen foil. These rim portions are initially formed as an integral part of the plane or flat screen.

The basic teaching of the invention is that the screen foil or rather the screen body formed into the three-dimensional conical shape and the upper and lower flanges constitute a one piece integral structure without any seams and without any joining work steps. It has been found that the screen foils, which in the common experience and opinion of experts are brittle, especially if these screens have been formed by electrodeposition, may be worked mechanically so that the flanges at the upper and lower ends may be manufactured by such mechanical non-cutting shaping work of the electrodeposited edges which for this purpose were made larger initially.

As compared to known processes, the non-cutting shaping of the flanges produces screen bodies having an extremely low weight since the material of which these parts are made is not thicker, but even slightly thinner than the material of the perforated screen area proper. Nevertheless, the present non-cutting shaping causes a high stability. Vibration or flutter stress ruptures caused heretofore by the large mass of the flange at the upper end of the screen body, do not occur any more in screen bodies made according to the present method. It is well known that soldering, welding and the centering of components in molds for injection molding of plastic parts and the like, are additional process steps which may be rather time consuming and require complicated auxiliary implements. All this extra work and tools are saved by the invention, whereby the manufacture is substantially simplified and costs are reduced by saving material, labor, and tools.

Since it has been found that the material of the electrodeposited screen foil may be shaped mechanically, a convenient and particularly advantageous feature of the invention avoids soldering or welding the longitudinal seam and provides a form-locking joint. This form-locking joint can be made either by engaging appropriate lugs or by folding to form a scarf joint. Thus, the screen foil need not be subjected to a heat treatment.

Depending on requirements and the particular brand, the screen bodies manufactured by the invention may be rigidly fixed to so-called rasping or grating disks which are to tear and shred the produce to be centrifuged. It has been common practice so far to attach these disks by riveting or soldering. According to the invention, the rasping disks may be attached to the lower flange not only by soldering or form-locking or riveting, but also by gluing. It is a particular advantage of the invention that the grating disks may be electrodeposited, as well.

Though the essential advantage of the invenion is seen in the fact that the screen foils may be made as plain, flat circular-sector pieces by electrodeposition, the present method may also be applied even if the screen foils are made by etching.

Opposite the longitudinal seam the screen foil is provided with a weight balancinbg zone by increasing the material thickness or by reducing the hole size for obtaining a dynamically homogeneous and thus balanced rotary body. This type of balancing avoids causing vibration or flutter stress ruptures since the common practice of balancing by applying solder dots to the screen body, which entails an undesired thermal stress of the material, is obviated or at least is reduced to a minimum.

According to the invention there is further provided a centrifugal screen body in which the large end and small end diameter flanges or collars are an integral part of the screen body proper, said flanges having been formed by a non-cutting shaping operation.

BRIEF FIGURE DESCRIPTION

In order that the invention may be clearly understood, it will now be described, by way of example, with reference to the accompanying drawings, wherein.

Figure 11:
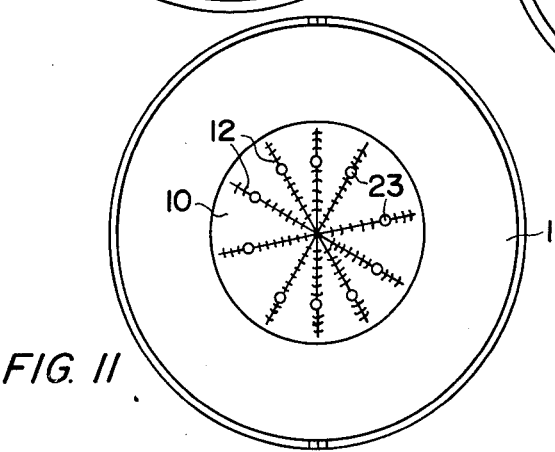
Figure 12:

FIGS. 7, 8, 9, and 10 are top plan views showing examples of screen bodies of the invention;

FIG. 11 is a top plan view of a screen body including a built-in rasping or grating disk; and FIG. 12 is a partial cross-sectional view on an enlarged scale of an electrodeposited grating disk.

DETAILED DESCRIPTION OF PREFERRED EXAMPLE EMBODIMENTS ILLUSTRATING THE BEST MODE OF THE INVENTION

Figure 1:
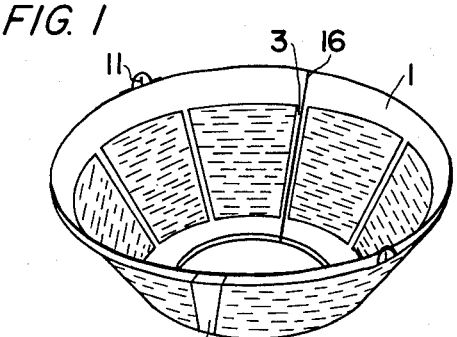
FIG. 1 is a perspective view of the screen body manufactured in accordance with the present method.

FIG. 1 shows a perspective view of a conically or frustum shaped screen body 1, especially for continuously operable household juice centrifugals, according to the invention.

Figure 2:
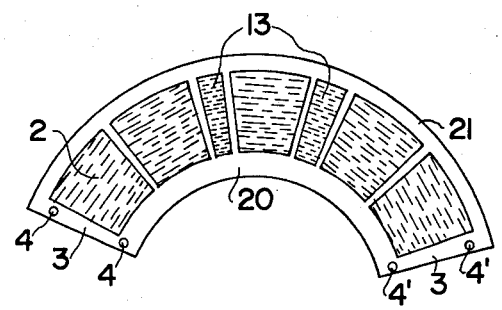
FIG. 2 is a plan view of the electrodeposited or etched screen foil, from which the screen body of FIG. 1 is made.

The first step in manufacturing of the screen body involves making a plain circular-sector screen foil 2 shown in FIG. 2, preferably by electrodeposition. The radially extending longitudinal edges or margins 3 and the radially inner and outer curved rims 20 and 21 of the screen foil 2 are of such dimensions from the start that later these edges and rims may be used for the intended purpose. In the middle area of the screen foil 2, in symmetry with the longitudinal edges 3 and diametrically opposite thereof, there is provided at least one weight equalizing or balancing zone 13 which is obtained either by increasing the material thickness or by reducing the screen hole size. This feature of the present screen is incorporated therein already at the time of electrodeposition. Two or more such zones 13 may be provided as shown in FIG. 2. In the second step, the plain screen foil 2 is formed into the screen body 1 of FIG. 1. A longitudinal seam 16 is provided which is produced by interconnecting the longitudinal edges 3. Conveniently, this connection may be made by form locking the longitudinal edges 3. For this purpose, the longitudinal edges 3 may be provided with anchoring means 4, 4', 7, for example in the form of pins 4 fitting into holes 4'. Little tongues fitting into slots may be used for joining the edges 3 to each other as is known in sheet metal toys. A folded seam may also be provided. Such folded seams are known as scarf joints wherein the edges are bent over and engage each other and are joined to each other under pressure.

Figure 3:
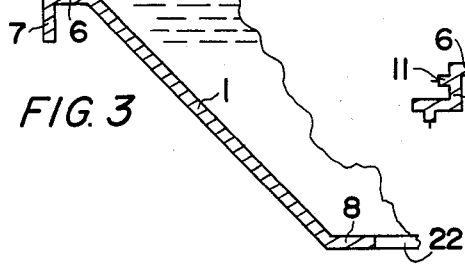
FIGS. 3, 4, 5 and 6 are examples of possible cross-sections of the wall of the screen body of FIG. 1 after non-cutting shaping showing configurations of the flanges.
Figure 4:
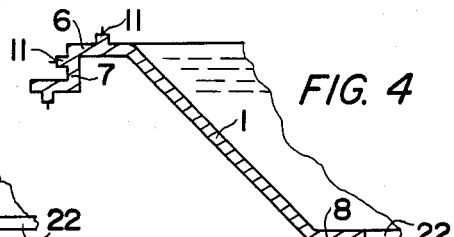

In the third step after the screen foil 2 has been transferred into the three-dimensional conical shape 1, the rims 20 and 21 are shaped in accordance with the invention at the upper and lower end of the conical body to form an upper flange 6 and a lower flange 8 as shown in FIGS. 3 and 4. This non-cutting shaping process is performed under pressure in respective male and female dies. The flanges may have any desired cross-sectional shape as, for example, shown at 7 in FIGS. 3 and 4. Discharging lugs 11 are then attached to the upper flange 6 and the central hole 22 is surrounded by the lower radially inwardly directed flange 8.

Figure 5:
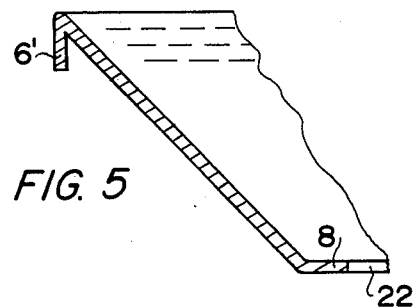
Figure 6:
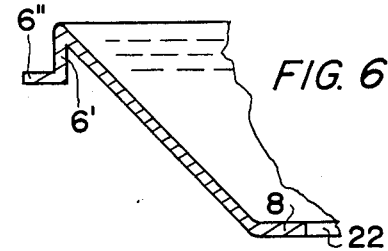

The upper flange 6 need not necessarily extend radially outwardly as shown in FIGS. 3 and 4. The upper flange may extend axially downwardly as shown at 6' in FIG. 5 or it may be provided with an axial section 6' and a radially outwardly extending ring portion 6" as shown in FIG. 6.

In a number of screen bodies a rasping or grating disk 10 shown in FIG. 12 is rigidly fixed to the lower flange 8. This rasping disk 10 may be made by electrodeposition. The removability of articles formed by electrodeposition from the mold does not permit the formation of acute angled cutting edges. However, according to FIG. 12, electroforming results in cutting edges 12 adjacent to substantially cylindrical through-holes 23. Though a more acute cutting edge appears to be more advantageous at first sight, the electroformed or deposited article is more practical for continuous service, as the cylindrical holes 23 may be cleaned more easily and reliably and there is no danger that the cutting edges 12 get dull. Furthermore, the electroformed cutting edge 12 has a sufficiently acute angle to yield a satisfactory edge sharpness, and it offers the advantage of higher durability for the intended purpose of shredding the produce in the juicier centrifugal.

The advantage of the screen bodies described and made in accordance with the invention in that, as compared to known methods, they have a hitherto unequalled low weight, so that they may be made with almost no heating, and that manufacture is easy and cost saving. Yet, the present screen bodies have an extremely high stability and sturdiness.

The lightweight structure has been achieved, since there are neither large plastic masses nor very thick rim or flange sections. The multiple mechanical shaping at its upper and lower ends or flanges provides the screen body 1 with a highly efficient mechanical strength and stability. The manufacturing is easy and simple since a non-cutting shaping is an economical method, especially for mass production. Even more weight can be saved if the grating or rasping disk 10 is also made of electrodeposited material.

The discharging lugs 11, which are usually required, may be punched and bent out of the material of the bent upper flange 6 and so the upper flange 6 also does not require any subsequent work.

The particular advantage of the present screen body becomes even more evident in conjunction with the electroforming manufacture of the screen foil used as the basic workpiece. It is possible, on the other hand, to manufacture the screen foil by etching and then proceeding in the same manner. This again has the advantage of a homogeneous and extremely robust screen body which may be manufactured at a low price.

Figure 7:
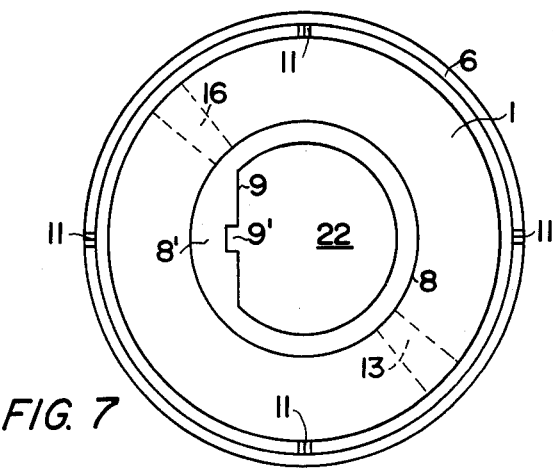

FIG. 7 shows a top plan view of a screen body 1 in which the radially inwardly facing flange 8 is reinforced at 8' to provide a hole shape 22 which is cut off along a chord 9 to accommodate a corresponding drive shaft cross sectional shape. Normally, the drive shaft of the household centrifuge would be provided with a tongue fitting into a respective groove 9' in the chord 9. Thus, the entire screen may easily be lifted off the drive shaft not shown. For example, four discharge lugs 11 may be provided at 90° integrals as shown in FIG. 7.

Figure 8:
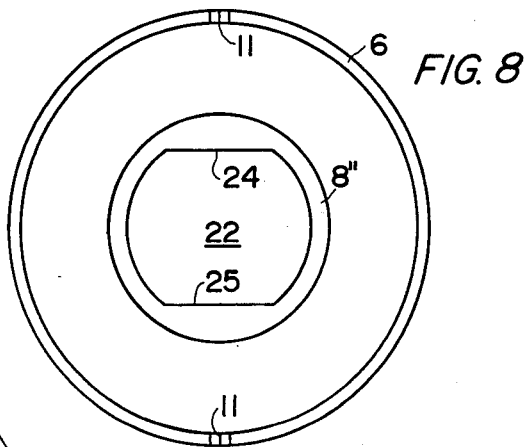

FIG. 8 shows a modification wherein the flange 8" is provided with two chords 24 and 25 whereby a correspondingly shaped drive shaft may be received in the hole 22. Only two discharge lugs 11 are shown in FIG. 8.

Figure 9:
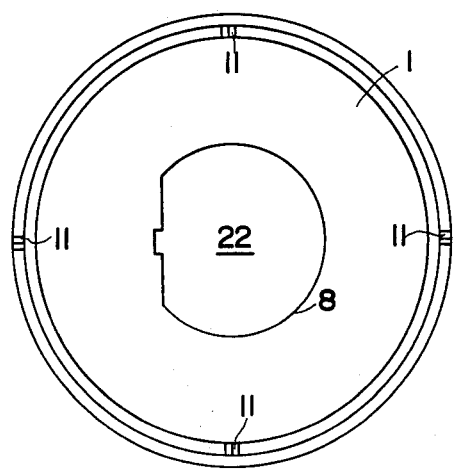

FIG. 9 shows an embodiment quite similar to that of FIG. 7 however the flange 8 is shown to be very narrow just sufficient to reinforce the lower end of the screen body 1.

Figure 10:
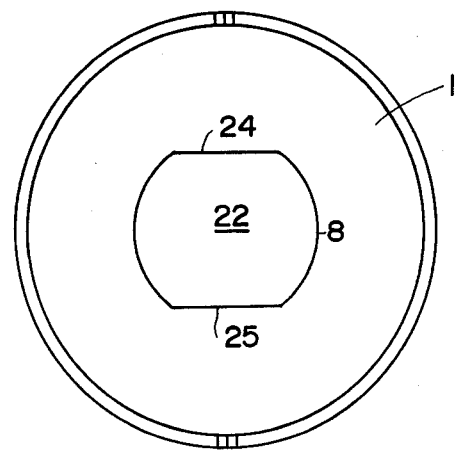

FIG. 10 is a view similar to that of FIG. 8 also with a very narrow flange 8 at the lower end of the screen body 1.

FIG. 11 is a view similar to that of FIGS. 7 to 10 however, illustrating the inserting grating or rasping disk 10 secured to the bottom flange 8, for example, by riveting, soldering, or gluing. Incidentally, the seam 16 between the edges 3 shown in FIG. 1 may also be formed by use of an appropriate adhesive.

Although the invention has been described with reference to specific example embodiments, it will be appreciated, that it is intended to cover all modifications and equivalents within the scope of the appended claims.

What is claimed is:

1. A one-piece, integral metal screen body for a centrifuge, comprising a screen member having a substantially conical shape with a large diameter end and a small diameter end, first fitting flange means extending radially outwardly from said large diameter end, second fitting flange means extending radially inwardly at said small diameter end, said first and second fitting flange means constituting integral elements of said screen member which has been deformed in a non-cutting manner for bending said flange means out of said screen member; as a result of said non-cutting manner, said flange means being dimensioned sufficient to eliminate vibration or flutter stress ruptures otherwise caused when said body is rotated at the highest limit of said centrifuge.

2. The metal screen body of claim 1, further comprising grating disk means operatively secured to said second radially inwardly extending fitting flange means.

3. The metal screen body of claim 1, wherein said screen member is made of metal by electrodeposition or galvanoplastic deposition.

4. The metal screen body of claim 1, wherein said screen member is made of an etched material.

5. The metal screen body of claim 1, further comprising grating disk means operatively secured to said second radially inwardly extending fitting flange means, said grating disk means being made of metal by electrodeposition or galvanoplastic deposition.

6. The metal screen body of claim 1, further comprising discharge means operatively secured to said first fitting flange means extending radially outwardly.

7. The metal screen body of claim 6, wherein said discharge means form an integral, single piece component of said first fitting flange means.

8. The metal screen body of claim 1, wherein said screen member has two end margins and securing means operatively connecting said end margins to each other to form said conical shape, said securing means comprising two interlocking folds forming a scarf joint.

9. The metal screen body of claim 8, further comprising balancing means located substantially diametrically opposite said securing means, said balancing means counteracting any unbalance resulting from said securing means.

10. The metal screen body of claim 9, wherein said balancing means comprise a ratio of hole area to metal area which differs from the corresponding ratio in said screen body outside said balancing means.

* * * * *